(12) United States Patent
Trujillo (10) Patent No.: US 8,328,106 B1
(45) Date of Patent: Dec. 11, 2012

(54) CONVERTIBLE TRANSACTION CARD (75) Inventor: Larry D. Trujillo, Denver, CO (US)

(73) Assignee: Converta Card, LLC, Denver, CO (US)

( * ) Notice: Subject to any disclaimer, the term of this patent is extended or adjusted under 35 U.S.C. 154(b) by 246 days.

(21) Appl. No.: 12/754,428

(22) Filed: Apr. 5, 2010

(51) Int. Cl.
*G06K 19/06* (2006.01)

(52) U.S. Cl. .................... 235/492; 235/449; 235/451

(58) Field of Classification Search ............ 235/492, 235/381, 449, 451
See application file for complete search history.

(56) References Cited

U.S. PATENT DOCUMENTS

| | | | |
|---|---|---|---|
| 3,583,317 A | 6/1971 | Gibson | |
| 5,285,328 A * | 2/1994 | Behr et al. ............. | 360/53 |
| 5,760,381 A | 6/1998 | Stich et al. | |
| 5,818,030 A | 10/1998 | Reyes | |
| 6,471,127 B2 | 10/2002 | Pentz et al. | |
| 6,623,039 B2 | 9/2003 | Thompson et al. | |
| 7,032,817 B2 | 4/2006 | Blank | |
| 7,065,195 B1 | 6/2006 | Smith et al. | |
| 7,083,086 B2 | 8/2006 | Whitaker | |
| 7,213,764 B2 | 5/2007 | Lasch et al. | |
| 7,347,360 B2 | 3/2008 | Lasch et al. | |
| 7,384,000 B2 * | 6/2008 | Anders et al. .......... | 235/488 |
| 7,513,422 B1 | 4/2009 | Tucker | |
| 7,607,574 B2 | 10/2009 | Kingsborough et al. | |
| 7,607,575 B2 | 10/2009 | Kingsborough et al. | |

* cited by examiner

*Primary Examiner* — Ahshik Kim
(74) *Attorney, Agent, or Firm* — Lee G. Meyer, Esq.; Meyer & Associates, LLC (57) ABSTRACT

A Standard Size Convertible Transaction Card Assembly includes a conventional transaction card of standard size and a keychain size transaction card of reduced "key-tag" size which is formed from a delineated portion of the standard size transaction card and separable there-from, wherein the keychain size transaction card contains all readable transaction information required to consummate the intended transaction. The delineation may be a printed line, demarcation, a line-of-weakness or perforation, such that the keychain size transaction card can be separated from the standard size transaction card manually, or with the assist of tools. The consumer can use the Standard Size Convertible Transaction Card Assembly as a conventional, standard size transaction card or separate the keychain size transaction card at the delineation for use as an independent keychain size transaction card. The Standard Size Convertible Transaction Card Assembly has a transaction information medium for retaining transactional information, such as a magnetic stripe, bar code, or computer chip, including a smart chip. The keychain size transaction card may contain an attachment hole or other suitable fastening means so that it can be conveniently carried on a keychain, lanyard, or the like, after separation.

49 Claims, 3 Drawing Sheets

CONVERTIBLE TRANSACTION CARD

BACKGROUND

The present invention relates to credit cards, debit cards, gift cards, membership cards, loyalty cards, promotional cards, e.g., frequent flyer cards, prepaid phone cards, identification cards and the like, all of which are generally known as transaction cards, wherein information for carrying out the specified transaction is carried upon or within the boundaries of the card on a Transaction Information Medium such as a Magnetic Stripe, a Bar Code, optical storage, a computer chip, a smart chip, or the like.

Individually encoded, transaction cards for such uses as credit cards, debit cards, gift cards, prepaid phone cards, membership cards, I.D. cards, and the like are well known. These transaction cards typically carry unique information which has been encoded for carrying out a specific function or transaction. Often, this Encoding is done through Bar Codes that are used in conjunction with an optical scanner; Magnetic Stripes or strips used in conjunction with magnetic/electric scanners; computer chips, including smart chips, used in conjunction with electronic reader/scanners/writers; optical storage and recognition devices such as heliograms and combinations thereof. These various formats permit automatic machine scanning of the card for identification, transactions, entry, security, and so forth.

For example, credit cards and debit cards are used to purchase goods and services, identification cards provide their holders with access to restricted areas, and ATM cards enable patrons to conduct monetary transactions with financial institutions. Personal information of the card holder that pertains to the transaction to be performed, e.g. account numbers, identification data, etc., is stored in the card. The transaction information storage medium can be a Magnetic Stripe on the card. In the case of an Integrated Circuit (IC) card, including a smart card, the information is stored in an integrated circuit electronic memory within a chip embedded into the card, either in lieu of or in addition to a Magnetic Stripe.

Typically, a transaction card is paper, or more usually, a rectangular thin piece of plastic that contains a Transaction Information Medium which contains encoded information in a Magnetic Stripe, Bar Code, microprocessor/semi-conductor memory, optical memory/magnetic memory, or the like for use in various transactions from, for example, getting cash from ATMs or making phone calls. These transaction cards, which have become a common vehicle of commerce of all types, may contain information that is affiliated with a user-specific program, group, or promotion. These cards may contain unique data (applicable to that specific card), generic data (applicable to a group), customized printed graphics, associated technologies (e.g. Bar Code, Magnetic Stripe, signature panel, optical heliograms, IC, SIMM chip, smart chip, microprinting or a combination of these.) A transaction card can be any size, but is generally in the industry described as a credit card of a size of 2.125" by 3.370" (width of about 86 mm and a nominal height of 54 mm). These cards have become well known as conventional, standard size transaction cards.

Conventional, standard size transaction cards have traditionally been sized to fit in a wallet or compartment within a notebook, briefcase, or the like. However, these conventionally sized cards are often too large and cumbersome to be conveniently carried on a more accessible medium, such as a keychain, wrist band, lanyard, or the like. Thus, transaction cards have been introduced in a smaller size for ease of handling. However, for transaction cards to be effectively carried on a keychain, their size must be significantly reduced from the conventional standard size credit card to a size, for example, from about 2½" long by about 1½" high (width of about 66 mm and a nominal height of 40 mm). These cards have been affectionately dubbed as "mini-cards," or "keychain cards," "key tags," or just "tags."

One particularly challenging Transaction Information Medium for storing transaction information on a smaller card is the Magnetic Stripe. This is due primarily to the fact that the degree to which conventional standard size transaction cards bearing a Magnetic Stripe may be reduced in size is limited by the requirements of standard Magnetic Stripe card readers, such as point-of-sale ("POS") terminals through which the user "swipes" the card to consummate a transaction. In order to ensure interface between the Magnetic Stripe readers and cards bearing Magnetic Stripes, the parameters defining the Magnetic Stripe are governed by the International Organization for Standardization (ISO) and the International Electrotechnical Commission (IEC). The ISO/IEC 7811 provides standards for the physical characteristics of the Magnetic Stripe, including the location of the stripe on the card, the surface profile of the stripe, and the height of the stripe above the card surface. Thus, a transaction card that is reduced in size, such as a keychain card, must comply with ISO/IEC 7811 physical characteristics in order to be functional, or otherwise be compatible, with existing card readers and POS terminals.

Proper functioning of the Magnetic Stripe is very important. On conventional transaction cards, such as, for example, standard size credit cards, the Magnetic Stripes contain encoded information that electronic readers can read to perform the specified function and/or confirm identification. Thus, on credit and/or debit cards, the Magnetic Stripe is usually encoded with specific account information, such as the credit card number, cardholder's name, the card expiration date, a personal identification code, and the like. If the electronic device for reading the encoded information cannot properly read the Magnetic Stripe and/or all the information contained thereon, the vendor must enter the information manually, using a keypad, telephone, or other similar device. Manually entering the encoded information adds both indirect and direct costs to the vendor. In addition, vendors are frequently charged increased transaction fees by the card issuer for a manually entered transaction.

Even so, consumers continue to demand smaller and smaller size transaction cards for convenience in consummating many transactions, such as the use of credit cards, debit cards, gift cards, ID cards, entry cards, membership cards, and the like. As a result, these cards have been further reduced in size from the conventional standard size transaction card, but are still operable with currently used standard size card readers. This "size" verses "information" dilemma has been handled by, for example, increasing the bit density on the stripe of the smaller sized card. (See for example, U.S. Pat. No. 6,471,127, which is incorporated herein by reference.) Because such a card is compatible with currently used card readers, no redesign of existing card reader technology was required. This compatibility of the Keychain Size Transaction Cards with current readers extends to a Magnetic Stripe, Bar Code, optical device or an electronic device, such as a chip or a smart chip, and even to optical heliographic readers.

These smaller transaction cards greatly enhance the efficiency of frequent transactions, including sales transactions, key locks, and the like, by allowing oft used cards to be readily handy and easily retrieved, such as on a keychain. Further, because such a card is readily stored on a keychain or similar device, the probability that the card would be lost or misplaced is reduced. Irrespective of the advantages, some consumers still preferred the security in handling of the standard size card. Some prefer using both for different transactions. Thus, while these keychain cards, mini-cards or tags are popular, many consumers prefer the standard size transaction cards or to use keychain cards for some uses, while maintaining the standard size card for others.

Heretofore, a transaction card issuer was forced to issue either a standard size transaction card, or a keychain card, or both, separately. This imposed an additional expense upon the issuer in that both transaction cards had to carry identical required transaction information in order to be useful. This practice resulted in a duplication of information on both cards that served the same purpose. When millions of cards are involved, the expense associated with issuance of these cards becomes enormous.

It, therefore, would be advantageous for a card issuer to have the ability to provide a single transaction card assembly of standard "credit card" size which could be used in its original standard form for consummating transactions or easily converted to a Keychain Size Transaction Card by merely separating the Keychain Size Transaction Card from Standard Size Convertible Transaction Card Assembly, while maintaining the integrity of the Transaction Information Medium containing the required transaction information on the Keychain Size Transaction Card such that the consumer could choose to use either the standard size card, by not separating the Keychain Size Transaction Card, or could separate the Keychain Size Transaction Card for independent use and completely discard the remainder of the Standard Size Transaction Card Body which would be devoid of any necessary transaction information.

Since all the information required to consummate the transaction would be maintained within the boundaries of the Keychain Size Transaction Card, either card would be operable with presently available standard reading equipment; and, the novel configuration would negate the expensive necessity of providing two separate cards, each with identical transaction information, while allowing the card holder to satisfy his/her own preference for either the standard size transaction card, or the keychain size card for a particular transaction.

SUMMARY OF THE INVENTION

In the broad aspect, a Standard Size Transaction Card Body of a size to fit, for example, in a wallet or compartment within a notebook, briefcase, or the like; and, a Keychain Size Transaction Card formed as an integral portion of the Standard Size Transaction Card Body, comprise a Standard Size Convertible Transaction Card Assembly wherein the Keychain Size Transaction Card is delineated from the Standard Size Transaction Card Body by a printed line, demarcation, a line-of-weakness or perforation, such that the Keychain Size Transaction Card is able of manual or tool-assisted separation from Standard Size Convertible Transaction Card Assembly; and, wherein the Keychain Size Transaction Card contains, within its boundaries, a Transaction Information Medium containing all properly positioned, readable transaction information required to consummate the transaction such that either the Standard Size Convertible Transaction Card Assembly or the Keychain Size Transaction Card, as separated from the Standard Size Transaction Card Body is able of independent use as a transaction card for consummating the indicated transaction. Advantageously, the Keychain Size Transaction Card can carry a fastening means, such as a hole, through which a key ring, keychain, or lanyard can by placed for ease of portability.

The readable information required for consummating the indicated transaction through a conventional standard card reader or POS terminal is selected from an encoded Magnetic Stripe, Bar Code, IC chip, smart chip, optical chip, heliogram, or the like. The transaction card can be, for example, without limitation, a loyalty card, membership card, identification card, gift card, credit card, debit card, key card, or the like. In one aspect of the invention, a Standard Size Convertible Transaction Card Assembly includes the Keychain Size Transaction Card wherein the Keychain Size Transaction Card is separated from the Standard Size Transaction Card Body by a line-of-weakness, so that the Keychain Size Transaction Card is able of easy separation from the Standard Size Transaction Card Body by hand and without the use of tools. At least one of the Standard Size Transaction Card Body and the Keychain Size Transaction Card body may have a shaped edge, such as to form, for example, an oval, a triangle, or the like.

Advantageously, a rectangular shaped Keychain Size Transaction Card is positioned within the Standard Size Convertible Transaction Card Assembly such that three sides of the Keychain Size Transaction Card are secured within the Standard Size Transaction Card Body so as to provide increased durability and retard unintended separation of the Keychain Size Transaction Card from the Standard Size Transaction Card Body when the Standard Size Convertible Transaction Card Assembly is used as a standard size transaction card.

BRIEF DESCRIPTION OF THE FIGURES

Exemplary embodiments are illustrated in referenced figures of the drawings. It is intended that the embodiments and figures disclosed herein are to be considered illustrative and exemplary rather than limiting. The features and advantages of the present invention, without limitation, are hereinafter described in the following detailed description of exemplary embodiments to be read in conjunction with the accompanying drawing figures and will be apparent to one skilled in the art that other embodiments are included, in view of the following, wherein like reference numerals are used to identify the same or similar parts in the similar views. However, it should be understood that use of like numerals for identification herein is not to be construed as an acknowledgement or admission that such features are necessary equivalent. It is also to be understood that where a plurality of similar features are depicted, not all of such identical features may be numerically labeled on the figures.

FIG. 4b is a rear view of the rectangular shaped Keychain Size Transaction Card as separated, along the lines of delineation, from the Standard Size Convertible Transaction Card Assembly shown in FIG. 4a.

DISCUSSION OF THE NOMENCLATURE

"Bar Code" shall mean an optically read, printed sequence of variable dimensioned lines which are able of optical recognition, but are not alpha-numeric.

"Encoding" shall mean the placement of variable data on a medium such as magnetic media via magnetic energy.

"Keychain Size Transaction Card" shall mean a transaction card of a size smaller than a traditional transaction card yet conforming to established transaction card standards for containing readable transaction information on a Transaction Information Medium, and may include a hole or other fastening means for attachment to a keychain, lanyard, or other external device. The term meant to be synonymous with "mini-card" or "key card" or "tag."

"Magnetic Stripe" shall mean in general a stripe or strip carried on a transaction card as a narrow band of metallized tape that can receive and store magnetic energy in one, two and/or three tracks of information by Encoding.

"Quiescent Zone" shall mean that portion of a readable medium which contains no information necessary to complete the indicated transaction.

"Standard Size Convertible Transaction Card Assembly" shall mean an assembly of a Standard Size Transaction Card Body and a Keychain Size Transaction Card wherein the Keychain Size Transaction Card is an integral defined portion of the Standard Size Transaction Body which is able of functional separation from the Standard Size Transaction Card Body.

"Standard Size Transaction Card Body" shall mean a card material of standard transaction card size incorporation the delineated Keychain Size Transaction Card.

"Transaction Information Medium" shall mean storage and/or interactive medium that is placed upon, added to, or embedded in a transaction card that stores, reads, writes, and transfers information in a machine readable character, magnetic, electronic, optical or electromagnetic manner. This term does not include alpha-numeric printed information either affixed to or printed directly on the transaction card. Exemplary Transaction Information Medium suitable for use with the present convertible transaction card include, but are not limited to, Magnetic Stripes, Bar Codes, optical chips, smart chips, microprocessors/storage, and memory of an optical, magnetic, semi-conductor, computer chips, both passive and active type and optical heliograms.

DETAILED DESCRIPTION

To facilitate an understanding of the principles upon which the instant described convertible transaction card is based, an exemplary advantageous embodiment will be undertaken. The exemplary embodiment of a Standard Size Convertible Transaction Card Assembly having a generally rectangular shape is described hereinafter. It will be appreciated, however, that the shape of either the Standard Size Convertible Transaction Card Assembly or the Keychain Size Transaction Card is not a limiting aspect of the device. Rather, the principles of the described device are applicable to any type of Standard Size Convertible Transaction Card Assembly containing a Keychain Size Transaction Card having dimensions which are smaller than those of the card that conforms and is readable by the indicated scanner or reader device, including but not limited to a published standard, such as ISO/IEC 7810.

It will be further realized that the instant described convertible transaction card is not limited to a single Transaction Information Medium. The Transition Information Medium(s) are selected for the card usage requirements. For example, the Standard Size Convertible Transaction Card Assembly may contain both a Bar Code and a Magnetic Stripe for carrying the required information where the mediums can be read in concert or independently. The transaction card customer is able to use either the entire Standard Size Convertible Transaction Card Assembly as a standard transaction card, or the Keychain Size Transaction Card as separated transaction card in consummating identical transactions. This includes the "contactless" transaction, including "Wave" scan, transactions which utilize either optical reading or smart card scanning technology and equipment.

When a Magnetic Stripe is used as the Transaction Information Medium, the Keychain Size Transaction Card, carried as a portion of the Standard Size Transaction Card Body, contains all the transaction information required to consummate the indicated transaction, even though the Magnetic Stripe extends the whole length of the Standard Size Convertible Transaction Card Assembly. In this aspect, the initial Encoding of the entire Magnetic Stripe that runs across the Standard Size Convertible Transaction Card Assembly is modified, such that dead or Quiescent Zones are employed, as will be more fully described below. In this manner, the Magnetic Stripe can be attached to the Standard Size Convertible Transaction Card Assembly in the conventional manner, yet the Keychain Size Transaction Card can contain all the required transaction information within a Transaction Information Medium which is contained completely within the boundaries of the Keychain Size Transaction Card. Upon separation of the Keychain Size Transaction Card from the Standard Size Transaction Card Body, those portions of the assembly containing the dead or Quiescent Zones are discarded. In this embodiment, the consumer (or card holder) can use either the entire Standard Size Convertible Transaction Card Assembly or the Keychain Size Transaction Card with standard card Magnetic Stripe reading equipment and technology.

It will be understood that in the current state of the art Magnetic Strips are typically 0.330" in width and contain three tracks (Track 1, Track 2, and Track 3) with each Track generally being 0.110". One of ordinary skill in the art would also understand the typical layout of the tracks, information typically associated with the tracks and the location of information. Furthermore, one skilled in the art would understand recording density, character configuration, information content, numeric bits per characteristic, number of alphanumeric characters, numeric characters, and so forth Likewise, one so skilled would understand the process of Encoding using start sentinels, field separators, end sentinel, format code, longitudinal redundancy check character, and so forth. One such type of Encoding product and system is known under the trademark MAGTEK®. It is also understood that the Standard Size Convertible Transaction Card Assembly may be utilized with non-standard processes known in the art and should not be considered limiting to such.

When three tracks are used, each is about ⅒" wide. The ISO/IEC 7811 standard, which is used by banks, specifies that Track 1 is 210 bits per inch (bpi), and holds 79 6-bit plus parity bit read-only characters. Track 2 is 75 bpi, and holds 40 4-bit plus parity bit characters. Track 3 is 210 bpi, and holds 107 4-bit plus parity bit characters. Credit card type transaction cards typically use only Tracks 1 and 2. Track 3 is a read/write track (which includes an encrypted PIN, country code, currency units and amount authorized), but its usage is not standardized among banks. The formats of the Tracks are well known in the art, as are operations for verifying cards and authorizing transactions. It will be understood that the amount and nature of contained information is a function of the institutional requirements, as well as the specific transaction to be consummated.

It is also well understood that a conventional plastic transaction card is constructed as a multi-layer structure. For example, it may comprise a core layer made of Teslin® (a polyolefin-based microporous film) "sandwiched" between two PVC printed layers. Transparent PVC overlay layers outside of the printed layers from the exterior surfaces of the card. Although superior to a card made only with PVC layers, this construction still results in a relatively brittle structure that constrains the durability of a Keychain Size Transaction Card. The flexure and torque that is experienced by the Keychain Sized Transaction Card can lead to cracking, particularly in the vicinity of the attachment hole. It is also somewhat problematic when using certain types of embedded chip and/or electronic Transaction Information Medium.

Figure 4A:
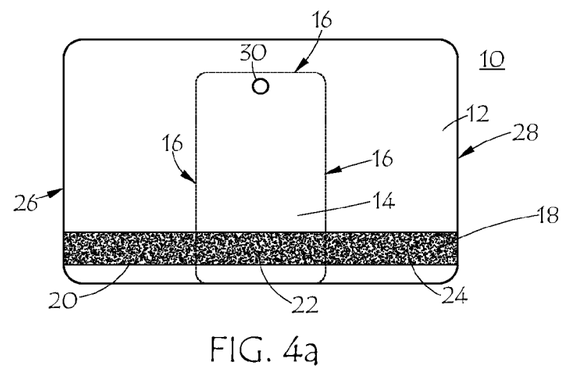
FIG. 4a is a rear view of the Standard Size Convertible Transaction Card Assembly of FIG. 3.
Figure 4B:
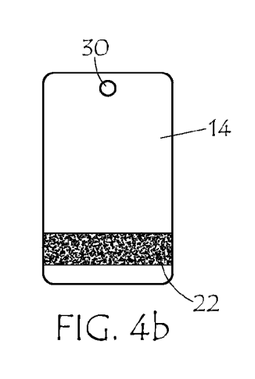

Turning to the Figures, typically, the Keychain Size Transaction Card 14 is delivered to the consumer within the Standard Size Convertible Transaction Card Assembly 10. Once the consumer decides to use the Keychain Size Transaction Card 14 as the preferred card size, it is cut or broken away from the Standard Size Transaction Card Body 12 at the delineation lines 16, as depicted in FIG. 4b. Once the Keychain Size Transaction Card 14 is separated from the Standard Size Transaction Card Body 12, the remains of the Standard Size Transaction Card Body 12 is disposed of. The shape of the Keychain Size Transaction Card 14 must be such as to be able of containment of the Transaction Information Medium within its boundaries.

The Standard Size Convertible Transaction Card Assembly 10 is able of facilitating transactions which require other forms of data retention and identification, including so called Smart Cards (i.e. cards containing computer chips (smart chip) that store necessary information), store value cards, (contactless) proximity chip cards, Bar Codes, and other transaction cards that are capable of storing and imparting information. A detailed discussion of data cards containing embedded computer chips may be found in U.S. Pat. No. 4,443,027 issued to McNeely et al., the entirety of which is hereby incorporated by reference.

As described in McNeely et al., information for identifying the authorized credit card user or providing credit authorization comprises a microprocessor, computer or integrated circuit chip embedded in the card. In this embodiment, the microprocessor (or computer chip) is embedded into the Keychain Size Transaction Card. Thus, the consumer (or card holder) can use the entire Standard Size Convertible Transaction Card Assembly or the separated Keychain Size Transaction Card for transactions which utilize computer chip reading/writing technology and equipment, as will be further described below.

Figure 1:
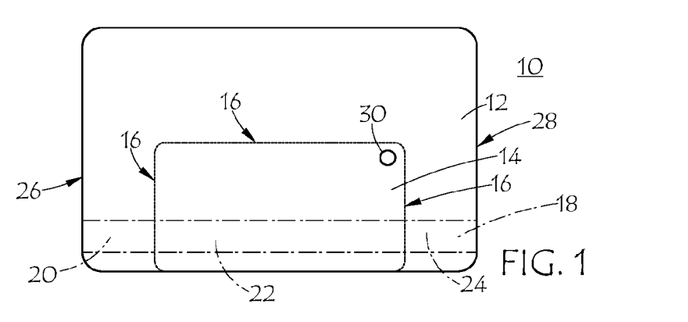
FIG. 1 is a front view of one embodiment of a Standard Size Convertible Transaction Card Assembly showing the delineation of a rectangular shaped Keychain Size Transaction Card.

A typical convertible transaction card is shown in FIG. 1 as a front view of a Standard Size Convertible Transaction Card Assembly 10, which has an overall size and shape of a conventional standard size transaction card and contains integrated therein a delineated rectangular Keychain Size Transaction Card 14 which may be selectively removed from the Standard Size Transaction Card Body 12, yet maintains all the Transaction Information Medium containing all the required transaction information in a readable form, when separated from the Standard Size Transaction Card Body 12, as will be more fully described.

It will be understood that the Standard Size Convertible Transaction Card Assembly 10 of FIG. 1 and the remainder of the figures can carry various printed graphics and messages on their front and/or back side, as is known in the industry. Graphics (not shown in the drawings) are typically printed on one or both sides of the Standard Size Convertible Transaction Card Assembly 10 to identify the issuer of the card, e.g. bank, retail company, or employer, and/or other information pertinent to the function of the card. For example, on the front surface of the Standard Size Convertible Transaction Card Assembly 10, a photograph of the authorized card user (or holder) may be imprinted, or an animal, or a flag. Alphanumeric messages and information may also appear, such as the dates of the plate's validity, as well as provision regarding the authorized user's account number, name, or the like. On the back side (not shown), a blank space suitable for receiving the authorized user's signature may be provided. This information, advertisements, graphics, and places for signatures, names, numbers, and the like may also be located within the boundaries of the Keychain Size Transaction Card 14.

Turning specifically to the details in the Figures, there is shown in FIG. 1 an example of a Standard Size Convertible Transaction Card Assembly 10 which is comprised of a Standard Size Transaction Card Body 12 which can be of any suitable transaction card material well known in the art, and a rectangular Keychain Size Transaction Card 14, which can be completely separated and removed from the Standard Size Transaction Card Body 12 for independent use as a rectangular Keychain Size Transaction Card 14. The boundaries of rectangular Keychain Size Transaction Card 14 are defined by delineation lines 16 which may be printed on the front surface, as well as the back surface of the Standard Size Transaction Card Body 12, to facilitate tool-assisted separation such as with scissors or the like; or, they may be indented lines-of-weakness or perforations to facilitate manual removal of the rectangular Keychain Size Transaction Card 14.

Advantageously, the rectangular Keychain Size Transaction Card 14 is contained within Standard Size Transaction Card Body 12, such that three complete sides of the rectangular Keychain Size Transaction Card 14 are enclosed or surrounded by the Standard Size Transaction Card Body 12 and the fourth side of the rectangular Keychain Size Transaction Card 14, where the Magnetic Stripe 18 is generally located, forms integrally or flush with the fourth side of the Standard Size Transaction Card Body 12. Thus, the rectangular Keychain Size Transaction Card 14 is positioned within the Standard Size Transaction Card Body 12 such that three sides of the rectangular Keychain Size Transaction Card 14 are secured within the Standard Size Transaction Card Body 12 so as to provide increased durability and retard unintended separation of the rectangular Keychain Size Transaction Card 14 from the Standard Size Transaction Card Body 12 when the Standard Size Convertible Transaction Card Assembly 10 is used as a standard size transaction card.

Figure 2:
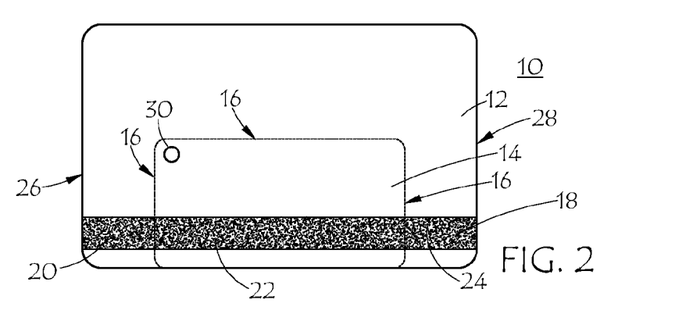
FIG. 2 is a rear view of the Standard Size Convertible Transaction Card Assembly of FIG. 1.

As better seen in FIG. 2, the Magnetic Stripe 18, for retaining the information required for the transaction, traverses the entire length of the Standard Size Convertible Transaction Card Assembly 10 from the leading edge 26 to the trailing edge 28 of the Standard Size Convertible Transaction Card Assembly 10. Magnetic Stripe 18 generally comprises a first Quiescent Zone 20 which runs from leading edge 26 to the delineation line 16, an active (transaction) zone 22 of Magnetic Stripe 18 which runs the length of the rectangular Keychain Size Transaction Card 14 between the delineation lines 16 as shown, and a second Quiescent Zone 24 which extends from the delineation line 16 to the trailing edge 28. Thus, all of the information required to be placed on the Magnetic Stripe 18 to consummate the indicated transaction is present within the boundaries of the rectangular Keychain Size Transaction Card 14 and forms the Transaction Information Medium.

The Standard Size Convertible Transaction Card Assembly 10 conforms to the size of a standard card, having a generally rectangular shape with, for example, a nominal width of 86 mm and a nominal height of 54 mm and contains all of the transaction information required for use as a standard transaction card. Additionally, the rectangular Keychain Size Transaction Card 14 which generally has a nominal width of 66 mm and a nominal height of 40 mm, within its boundaries, contains the Transaction Information Medium containing all of the transaction information necessary for its independent use as a transaction card to consummate a transaction.

An attachment hole 30 is advantageously, located near one corner of the rectangular Keychain Size Transaction Card 14 and has a diameter of about 5 mm to accommodate attachment of the rectangular Keychain Size Transaction Card 14 to a key-ring. Thus, when the rectangular Keychain Size Transaction Card 14 is separated from the Standard Size Transaction Card Body 12 along the delineation lines 16, the rectangular Keychain Size Transaction Card 14 presents an independent functioning mini-card or key-tag for the user. Unexpectedly, the rectangular Keychain Size Transaction Card 14 is compatible with existing POS terminals without complying with some aspects of the ISO/IEC standards.

The Magnetic Stripe 18 may be applied to the Standard Size Convertible Transaction Card Assembly 10 before or after lamination, or at any other preferred step known in the art, and may be encoded at any desired step known in the art during the manufacturing process of Standard Size Convertible Transaction Card Assembly 10, including preparation of a spool of Magnetic Stripe containing active zones and Quiescent Zones, such that the Magnetic Stripe 18 can be continuously laid down on the back of Standard Size Convertible Transaction Card Assembly 10 during processing.

Figure 3:
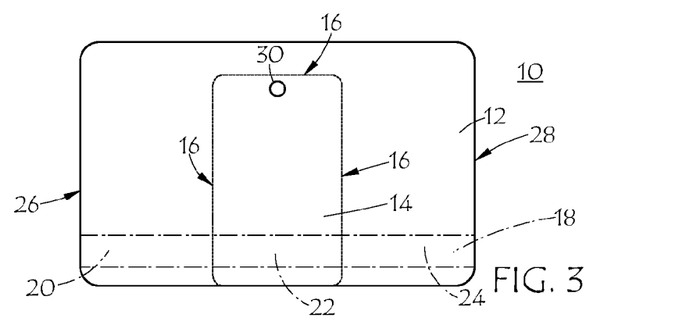
FIG. 3 is a front view of another embodiment of a Standard Size Convertible Transaction Card Assembly showing the delineation of a rectangular shaped Keychain Size Transaction Card.

Turning to FIG. 3, there is shown another embodiment, wherein the Keychain Size Transaction Card 14 is rectangular in shape, and is situated within the Standard Size Convertible Transaction Card Assembly 10 such that the long edge of the rectangular Keychain Size Transaction Card 14 is parallel with the short edge of the Standard Size Convertible Transaction Card Assembly 10. As shown in FIG. 4a, the Magnetic Stripe 18 is attached to the Standard Size Transaction Card Body 12 from the leading edge 26 to the trailing edge 28 in the similar manner as set forth in FIG. 1. However, the Quiescent Zones 20 and 24 now comprise a larger portion of the Magnetic Stripe 18 than in the previous embodiment reducing the size of the active zone 22 and thus the Transaction Information Medium.

The rectangular Keychain Size Transaction Card 14 delineated by delineation lines 16, as shown in FIG. 4a, can be separated, as previously described, from the Standard Size Transaction Card Body 12 resulting in the rectangular Keychain Size Transaction Card 14, as shown in FIG. 4b. As previously described, the delineation lines 16 can be merely printed lines on the front and back of the Standard Size Transaction Card Body 12. In accordance with this aspect, tools such as scissors, shears, or the like, are required to cut along the delineation lines 16 to separate the rectangular Keychain Size Transaction Card 14 from Standard Size Transaction Card Body 12. This process is well known in the art.

In accordance with another aspect, delineation lines 16 can comprise a line-of-weakness, i.e. indentations in the front and back surface of the Standard Size Transaction Card Body 12; or, the Standard Size Transaction Card Body 12 can actually be perforated intermittently along the delineation lines 16, wherein the perforations penetrate the Standard Size Transaction Card Body 12 front and back surfaces. In accordance with this aspect, the separation of the rectangular Keychain Size Transaction Card 14 is accomplished manually without the need of employing any tools or implements by merely breaking away the rectangular Keychain Size Transaction Card 14 from the Standard Size Transaction Card Body 12 in the well known manner. A combination of these delineation lines for particular application can also be used.

It will be realized by the skilled artisan that the rectangular Keychain Size Transaction Card 14, as shown in FIGS. 1 and 2, contains a longer active zone 22 than the rectangular Keychain Size Transaction Card 14, as shown in FIGS. 3, 4a, and 4b. Thus, the rectangular Keychain Size Transaction Card 14 having the longer active zone 22 has a greater Transaction Information Medium than that wherein the active zone 22 is shorter. Thus, there may be applications wherein the rectangular shaped Keychain Size Transaction Cards having a longer active zone 22 is more useful for certain types of transactions requiring more transaction information.

Figure 5:
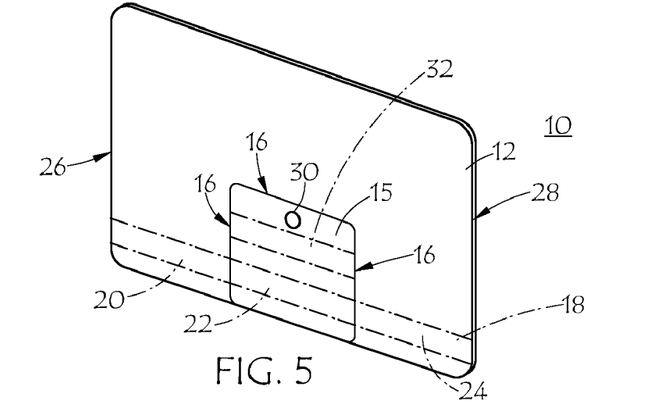
FIG. 5 is a perspective front view of another embodiment of a Standard Size Convertible Transaction Card Assembly having two means for maintaining the readable transaction information required to consummate the transaction showing the delineation of the Keychain Size Transaction Card.
Figure 6:
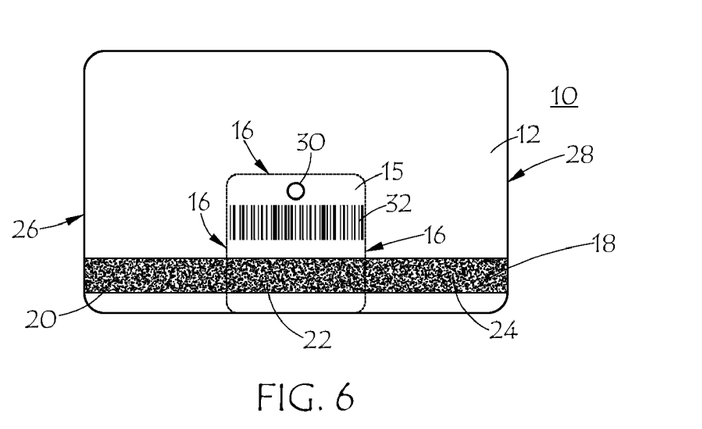
FIG. 6 is a rear view of the Standard Size Convertible Transaction Card Assembly of FIG. 5.

There is shown in FIG. 5 a further embodiment of a Standard Size Convertible Transaction Card Assembly 10 wherein two Transaction Information Mediums for retaining transaction data are employed. As better seen in FIG. 6, the first is a standard Bar Code 32, which spans the width of the square Keychain Size Transaction Card 15 and is disposed above the Magnetic Stripe 18. The second is a Magnetic Stripe 18 essentially as described for FIGS. 3 and 4a above.

Figure 7:
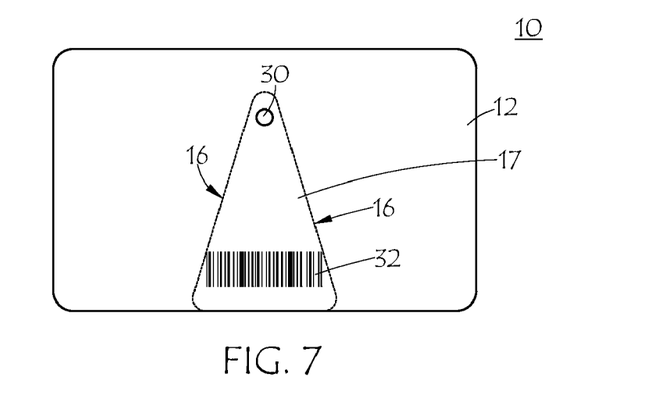
FIG. 7 is a rear view of another embodiment of a Standard Size Convertible Transaction Card Assembly showing the delineation of a triangular shaped Keychain Size Transaction Card.

There is shown in FIG. 7 a further embodiment of the Standard Size Convertible Transaction Card Assembly 10 wherein the Keychain Size Transaction Card 17 formed by the delineation lines 16 is triangular in shape, rather than rectangular, as previously seen. There is contained within the delineation lines 16 a single Bar Code 32 and an attachment hole 30. The Standard Size Convertible Transaction Card Assembly 10 can thus be used as a transaction card of standard size or the triangular Keychain Size Transaction Card 17 can be separated from the Standard Size Transaction Card Body 12, as previously described, and the triangular Keychain Size Transaction Card 17 can be used independently.

Figure 8:
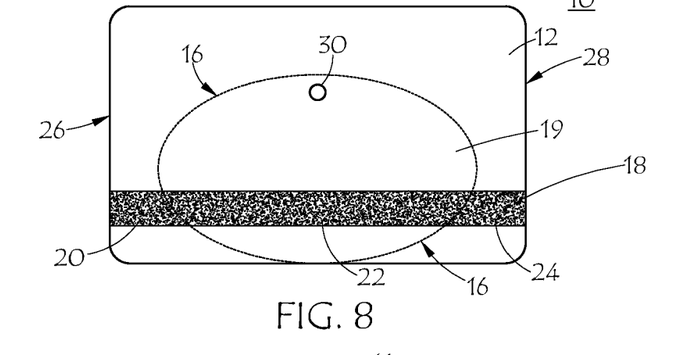
FIG. 8 is a rear view of another embodiment of a Standard Size Convertible Transaction Card Assembly showing an oval delineated Keychain Size Transaction Card.

In FIG. 8, there is shown another embodiment employing a Magnetic Stripe 18 as the sole Transaction Information Medium wherein the Keychain Size Transaction Card 19 is oval in shape. As previously described, the Magnetic Stripe 18 is attached to the Standard Size Transaction Card Body 12 from the leading edge 26 to the trailing edge 28 in the similar manner as set forth in FIG. 3. Likewise, the first Quiescent Zone 20 extends from the leading edge 26 to the delineation line 16 proximate the leading edge 26 with the active zone 22 between the delineation lines and the second Quiescent Zone 24 extending from the trailing edge 28 to the delineation line 16 proximate the trailing edge 28.

It will be realized by the skilled artisan that other Keychain Size Transaction Card shapes are within the scope of the present invention using the Magnetic Stripe 18 medium, the optical Bar Code 32, or other Transaction Information Medium, as previously described or as further described herein, either signally or together. It will be realized by the skilled artisan that other Transaction Information Medium, which are currently associated with conventional size transaction cards, can be used in the accordance with the Standard Size Convertible Transaction Card Assembly 10. Further, the Encoding of the Magnetic Stripe 18 presents some difficulty during the Encoding process, because only the active zone 22 of the Magnetic Stripe 18 adhered to the Standard Size Convertible Transaction Card Assembly 10 is used to retain information. Thus, the Encoding equipment must not prematurely begin the transfer of information in the Quiescent Zones 20 and 24 on the Magnetic Stripe 18 adhered to the Standard Size Convertible Transaction Card Assembly 10.

To ensure that encoder properly places the data on the Standard Size Convertible Transaction Card Assembly 10, a complex "delayed Encoding" process must be followed in which the encoder detects the leading edge 26 of the Standard Size Convertible Transaction Card Assembly 10 and calculates a delay period based on the distance between the leading edge 26 of the Standard Size Convertible Transaction Card Assembly 10 and the delineation lines 16 which forms the first Quiescent Zone 20. Likewise, a delay period is calculated between the delineation line 16 and trailing edge 28 which forms the second Quiescent Zone 24. State of the art Encoding equipment is a combination of hardware and software controlling the processing of the Standard Size Convertible Transaction Card Assembly 10 as it is transported in an automated manner via a transport base.

Other Transaction Information Medium is available to be used in accordance with the instant convertible transaction card. It will be realized that the advantage of using, for example, microprocessors, smart chips, and optical interfaces over Magnetic Stripes 18, is that these medium can be easily placed within the delineation lines 16 representing the boundaries of the Keychain Size Transaction Card without the necessity of providing, for example, Quiescent Zones, or the like. It will be realized, however, that the technology required in embedding these types of Transaction Information Medium within the Standard Size Convertible Transaction Card Assembly 10 is somewhat more complex and expensive. In this respect, however, some of these Transaction Information Mediums can employ read/write type technologies such that Encoded information can be added and/or changed.

For example, IC cards having an onboard microprocessor and an onboard semiconductor memory have substantially increased the amount and flexibility of information which can be recorded in a standard size transaction cards. While Magnetic Stripe cards are inexpensive, they are only able to record certain limited information typically recorded prior to issuance, and which information is typically not changed for the life of the card. While such cards have served their purpose, it is desirable in many instances to provide a card with additional read/write storage capability, but which still possesses some of the security characteristics which prevent readout of the information, except by authorized parties and on authorized terminals.

One advanced medium technology for identification, as well as storing changeable transaction information, is the optical smart card, which uses a micro-chip having the transaction information stored thereon an optical heliographic sensor pad which is capable of detecting and collecting light beams emitted from a remote reader/transmitter. This technology, which is currently in use, uses a light source capable of emitting data stored on a micro-chip, back and to an optical remote reader which may be coupled with an electronic sensor pad. In this manner, a standard transaction card can be easily authenticated by exciting an imprinted hologram on the transaction card. In this embodiment, the hologram and associated electronics are contained within the boundaries of the Keychain Size Transaction Card.

Figure 9:
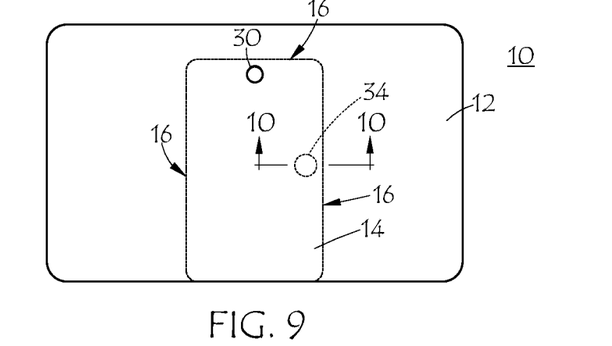
FIG. 9 is a front view of another embodiment of a Standard Size Convertible Transaction Card Assembly having an Integrated Circuit means for maintaining the readable transaction information required to consummate the transaction showing a rectangular delineated Keychain Size Transaction Card.

Turning again to the figures, there is shown in FIG. 9 a Standard Size Convertible Transaction Card Assembly 10, which is comprised of a Standard Size Transaction Card Body 12 and a rectangular Keychain Size Transaction Card 14, which can be completely separated and removed from the Standard Size Transaction Card Body 12 for independent use as previously described. The boundaries of the rectangular Keychain Size Transaction Card 14 are defined by delineation lines 16 which may be printed on the front surface, as well as the back surface of the Standard Size Transaction Card Body 12. Separation of the rectangular Keychain Size Transaction Card 14 is accomplished as set forth previously above. Within the boundaries of the rectangular Keychain Size Transaction Card 14, there is embedded a microprocessing computer chip assembly 34 comprised of an onboard microprocessor (not shown) and an onboard semi-conductor memory (not shown) which is accessible from exterior the card only by way of the onboard microprocessor. Advantageously, the microprocessing computer chip assembly 34 can also include an optical or magnetic mass storage device which is capable of read/write interface through the microprocessor.

Figure 10:
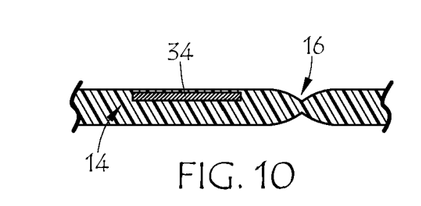
FIG. 10 is a cross sectional view along lines 10-10 of FIG. 9.

In accordance with this embodiment, as well known in the art, encoded information is stored within the microprocessing computer chip assembly 34 and is accessible by means of a read/write interface unit. If the microprocessor storage unit is optical, the interface may be a laser reader/writer interface. If the microprocessor storage unit is magnetic, the interface may be electronic or magnetic, as well known in the art. As better seen in FIG. 10, the microprocessing computer chip assembly 34 is embedded within the rectangular Keychain Size Transaction Card 14 toward the front surface thereof to allow optical access to the microprocessing computer chip assembly 34 when required.

In accordance with another embodiment, the Transaction Information Medium can comprise a smart chip having transmitting and receiving capability commonly referred to as a "smart chip" such that the smart chip can "handshake" with a read/write interfaces. In accordance with this embodiment, the smart chip is able of sending a signal to a tuned receiver to initiate an information transfer interface and establish a "handshake" between the transaction card and the reader/writer as is well known in the art. This enables the use of the card in a so called contactless "wave" transaction.

Figure 11:
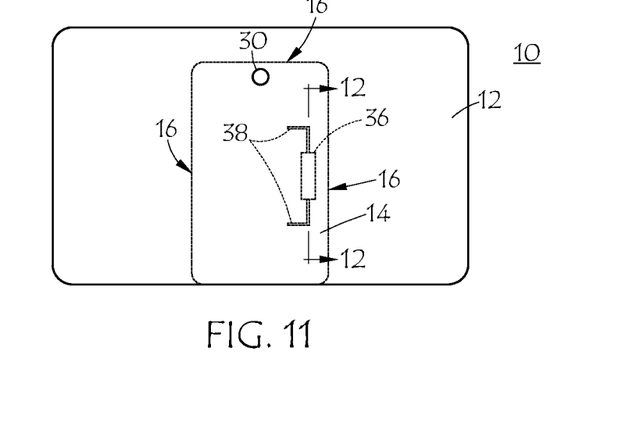
FIG. 11 is a front view of another embodiment of a Standard Size Convertible Transaction Card Assembly having a smart chip and antenna assembly for maintaining the readable transaction information required to consummate the transaction showing a rectangular delineated Keychain Size Transaction Card.

Turning to FIG. 11, there is shown a Standard Size Convertible Transaction Card Assembly 10, which is comprised of a Standard Size Transaction Card Body 12 and a rectangular Keychain Size Transaction Card 14, which can be completely separated and removed from the Standard Size Transaction Card Body 12 for independent use, as previously described. The boundaries of the rectangular Keychain Size Transaction Card 14 are defined by delineation lines 16 which may be printed on the front surface, as well as the back surface of the Standard Size Transaction Card Body 12. Separation of the rectangular Keychain Size Transaction Card 14 is accomplished as set forth previously above.

Within the boundaries of the rectangular Keychain Size Transaction Card 14 there is embedded a smart chip assembly 36 having an onboard microprocessor component (not shown), an onboard semi-conductor memory (not shown) and advantageously an onboard mass memory storage (not shown), as well as a transceiver component (not shown) connected to an embedded antenna 38. Advantageously, smart chip assembly 36 is adapted to interact or coordinate with information stored on mass storage assembly through the onboard microprocessor. By means of electromagnetic pulses sent by the smart chip assembly 36 through antenna 38, information identifying the authorized transaction card user and/or providing transaction authorization is communicated in an encoded manner to a receiver (not shown) for consummating the transaction. Once the transmitted encoded information is identified as authorized by the receiver, a "handshake" is established wherein the transaction information sent by the smart chip assembly 36 is downloaded, as well known in the art, and the transaction consummated.

Figure 12:
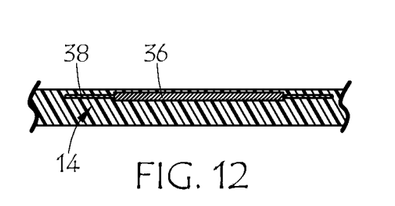
FIG. 12 is a cross sectional view along lines 12-12 of FIG. 11.

As better shown in FIG. 12, the smart chip assembly 36 is advantageously embedded within the boundaries of the rectangular Keychain Size Transaction Card 14, at the top surface thereof, so that the antennas 38 can easily communicate with compatible transceivers. The smart chip assembly 36 can be used alone or in combination with one or more of the above-mentioned Transaction Information Mediums.

While a number of exemplary aspects and embodiments have been discussed above, those of skill in the art will recognize certain modifications, permutations, additions and sub-combinations thereof. It is, therefore, intended that the following appended claims and claims hereafter introduced are interpreted to include all such modifications, permutations, additions and sub-combinations as are within their true spirit and scope. All of the methods, devices, and systems disclosed and claimed herein can be made and executed without undue experimentation in light of the present disclosure. While the methods, devices, and systems of this invention have been described in terms of embodiments, it will be apparent to those of skill in the art that variations may be applied to the methods, devices, and systems and in the steps or in the sequence of steps of the methods described herein without deviating from the concept, spirit, and scope of the invention. Various substitutions can be made to the system described without departing from the spirit of the claimed invention. All such similar substitutes and modifications apparent to those skilled in the art are deemed to be within the spirit, scope, and concept of the claimed invention.

What is claimed is:

1. A convertible transaction card for consummating an indicated transaction comprising:
   (a) a standard size transaction card body having a front side and a back side;
   (b) a keychain size transaction card formed as an integral portion of the standard size transaction card body such that the standard size transaction card body and the integrated keychain size transaction card together comprise a standard size convertible transaction card assembly;
   (c) a delineation line on the standard size transaction card body defining the boundaries of the keychain size transaction card and facilitating the separation of the keychain size transaction card from the standard size transaction card body; and,
   (d) a transaction information medium, contained within the boundaries of the keychain size transaction card which contains all transaction information required to consummate the indicated transaction such that either the standard size convertible transaction card assembly or the keychain size transaction card, as separated from the standard size transaction card body, is able of independent use as a transaction card for consummating the indicated transaction.

2. The convertible transaction card of claim 1 wherein the transaction information medium is selected from a group consisting of a magnetic stripe, a bar code, a microprocessing computer chip assembly, smart chip assembly, optical storage and recognition devices, or combinations thereof.

3. The convertible transaction card of claim 1 wherein the keychain size transaction card has a shape selected from a rectangle, square, triangle, or oval.

4. The convertible transaction card of claim 1 wherein the delineation line is selected from the group consisting of a printed line, demarcation, a line-of-weakness, perforation, or combination thereof.

5. The convertible transaction card of claim 1 wherein the keychain size transaction card contains a means for fastening the keychain size transaction card to a carrying device.

6. The convertible transaction card of claim 5 wherein the carrying device is selected from a key ring, a keychain, a wristband, a lanyard, or combinations thereof.

7. The convertible transaction card of claim 5 wherein the means for fastening the keychain size transaction card is a hole from the front side to the backside of the standard size transaction card body within the boundaries of the keychain size transaction card.

8. The convertible transaction card of claim 1 wherein the delineation line is a printed line on at least one side of the standard size transaction card body and separation of the keychain size transaction card from the standard size transaction card body is tool assisted.

9. The convertible transaction card of claim 1 wherein the delineation line is a demarcation, a line-of-weakness, perforations, or combination thereof and separation of the keychain size transaction card from the standard size transaction card body is manual.

10. The convertible transaction card of claim 1 wherein the delineation line is a demarcation, a line-of-weakness, perforations, or combination thereof and the keychain size transaction card has a rectangular shape situated within the standard size transaction card body such that three sides of the keychain size transaction card are secured within the standard size transaction card body so as to provide increased durability and retard unintended separation of the keychain size transaction card from the standard size transaction card body.

11. The convertible transaction card of claim 10 wherein the transaction information medium comprises a magnetic stripe.

12. The convertible transaction card of claim 11 wherein the magnetic stripe comprises two tracks for storing the encoded data.

13. The convertible transaction card of claim 12, wherein the encoded data on a first of the two tracks is encoded at greater than about 210 bits per inch.

14. The convertible transaction card of claim 12, wherein the encoded data on the first of the two tracks is encoded at about 260 bits per inch.

15. The convertible transaction card of claim 12, wherein the encoded data on a second of the two tracks is encoded at greater than about 75 bits per inch.

16. The convertible transaction card of claim 12, wherein the encoded data on the second of the two tracks is encoded at about 100 bits per inch.

17. The convertible transaction card of claim 10, wherein the encoded data is encoded using two-frequency encoding.

18. The convertible transaction card of claim 1, wherein the dimensions of the standard size transaction card body are about 86 mm by about 54 mm and the dimensions of the keychain size transaction card are about 66 mm by about 40 mm.

19. The convertible transaction card of claim 1 wherein the transaction information medium comprises microprocessing computer chip assembly.

20. The convertible transaction card of claim 1 wherein the transaction information medium comprises smart chip assembly.

21. A standard size convertible transaction card assembly comprising:
   (a) a standard size transaction card body having a front side and a back side;
   (b) a keychain size transaction card formed as an integral portion of the standard size transaction card body;
   (c) a delineation line on the standard size transaction card body defining the boundaries of the keychain size transaction card and facilitating the separation of the keychain size transaction card from the standard size transaction card body; and,
   (d) a transaction information medium, contained within the boundaries of the keychain size transaction card which contains all transaction information required to consummate the indicated transaction such that either the standard size convertible transaction card assembly or the keychain size transaction card, as separated from the standard size transaction card body, is able of independent use as a transaction card for consummating the indicated transaction.

22. The standard size convertible transaction card assembly of claim 21 wherein the transaction information medium is selected from a group consisting of a magnetic stripe, a bar code, a microprocessing computer chip assembly, smart chip assembly, optical storage and recognition devices, or combinations thereof.

23. The standard size convertible transaction card assembly of claim 21 wherein the keychain size transaction card has a shape selected from a rectangle, square, triangle, or oval.

24. The standard size convertible transaction card assembly of claim 21 wherein the delineation line is selected from the group consisting of a printed line, demarcation, a line-of-weakness, perforation, or combination thereof.

25. The standard size convertible transaction card assembly of claim 21 wherein the keychain size transaction card contains a means for fastening the keychain size transaction card to a carrying device.

26. The standard size convertible transaction card assembly of claim 25 wherein the carrying device is selected from a key ring, a keychain, a wristband, a lanyard, or combinations thereof.

27. The standard size convertible transaction card assembly of claim 25 wherein the means for fastening the keychain size transaction card is a hole from the front side to the backside of the standard size transaction card body within the boundaries of the keychain size transaction card.

28. The standard size convertible transaction card assembly of claim 21 wherein the delineation line is a printed line on at least one side of the standard size transaction card body and separation of the keychain size transaction card from the standard size transaction card body is tool assisted.

29. The standard size convertible transaction card assembly of claim 21 wherein the delineation line is a demarcation, a line-of-weakness, perforations, or combination thereof and separation of the keychain size transaction card from the standard size transaction card body is manual.

30. The standard size convertible transaction card assembly of claim 21 wherein the delineation line is a demarcation, a line-of-weakness, perforations, or combination thereof and the keychain size transaction card has a rectangular shape situated within the standard size convertible transaction card assembly such that three sides of the keychain size transaction card are secured within the standard size transaction card body so as to provide increased durability and retard unintended separation of the keychain size transaction card from the standard size transaction card body.

31. The standard size convertible transaction card assembly of claim 21 wherein the transaction information medium comprises a magnetic stripe.

32. The standard size convertible transaction card assembly of claim 21, wherein the magnetic stripe is positioned parallel to the long edge of the standard size convertible transaction card assembly.

33. The standard size convertible transaction card assembly of claim 32 wherein the magnetic stripe comprises two tracks for storing the encoded data.

34. The standard size convertible transaction card assembly of claim 33, wherein the encoded data is encoded using two-frequency encoding.

35. The standard size convertible transaction card assembly of claim 21, wherein the dimensions of the standard size transaction card body are about 86 mm by about 54 mm and the dimensions of the keychain size transaction card are about 66 mm by about 40 mm.

36. The standard size convertible transaction card assembly of claim 21, wherein the transaction information medium comprises microprocessing computer chip assembly.

37. The standard size convertible transaction card assembly of claim 21 wherein the transaction information medium comprises smart chip assembly.

38. A convertible transaction card for consummating an indicated transaction comprising:
   (a) a standard size transaction card body having a dimension of about 86 mm by about 54 mm having a front side and a back side;
   (b) a rectangular keychain size transaction card having a dimension of about 66 mm by about 40 mm formed as an integral portion of the standard size transaction card body such that the standard size transaction card body and the integrated keychain size transaction card together comprise a standard size convertible transaction card assembly;
   (c) a delineation line on the standard size transaction card body defining the boundaries of the keychain size transaction card and facilitating the separation of the keychain size transaction card from the standard size transaction card body comprising a printed line on at least one side of the standard size transaction card body; and,
   (d) a transaction information medium comprised a magnetic stripe wherein the magnetic stripe is positioned parallel to the long edge of the standard size convertible transaction card assembly and is contained within the boundaries of the keychain size transaction card which contains all transaction information required to consummate the indicated transaction such that either the standard size convertible transaction card assembly or the keychain size transaction card, as separated from the standard size transaction card body, is able of independent use as a transaction card for consummating the indicated transaction.

39. The convertible transaction card of claim 38, wherein the magnetic stripe comprises two tracks for storing the encoded data.

40. The convertible transaction card of claim 39, wherein the encoded data is encoded using two-frequency encoding.

41. The convertible transaction card of claim 38, wherein the magnetic stripe from the leading edge of the standard size transaction card body to the delineation line proximate the leading edge is quiescent; and, wherein the magnetic strip from the delineation line proximate the trailing edge to the trailing edge of the standard size transaction card body is quiescent.

42. The convertible transaction card of claim 38, wherein the transaction information medium further comprises a bar code, a microprocessing computer chip assembly, smart chip assembly, optical storage and recognition devices, or combinations thereof.

43. The convertible transaction card of claim 38, wherein the delineation line is selected from printed line, demarcation, a line-of-weakness, perforation, or combination thereof; and, wherein the rectangular keychain size transaction card is situated within the standard size transaction card body such that three sides of the keychain size transaction card are secured within the standard size transaction card body so as to provide increased durability and retard unintended separation of the keychain size transaction card from the standard size transaction card body.

44. The convertible transaction card of claim 11, wherein the magnetic stripe comprises three tracks for storing the encoded data.

45. The convertible transaction card of claim 38, wherein the magnetic stripe comprises three tracks for storing the encoded data.

46. A convertible transaction card for consummating an indicated transaction comprising:
(a) a standard size transaction card body having a front side and a back side;
(b) a keychain size transaction card formed as an integral portion of the standard size transaction card body such that the standard size transaction card body and the integrated keychain size transaction card together comprise a standard size convertible transaction card assembly;
(c) a delineation line on the standard size transaction card body defining the boundaries of the keychain size transaction card and facilitating the separation of the keychain size transaction card from the standard size transaction card body; and,
(d) a transaction information medium, contained within the boundaries of the keychain size transaction card which contains all transaction information required to consummate the indicated transaction such that either the standard size convertible transaction card assembly or the keychain size transaction card, as separated from the standard size transaction card body, is able of independent use as a transaction card for consummating the indicated transaction wherein the transaction information medium comprises a magnetic stripe comprising two tracks for storing the encoded data and wherein the encoded data on the first of the two tracks is encoded at about 260 bits per inch.

47. The convertible transaction card of claim 46, wherein the encoded data on a second of the two tracks is encoded at greater than about 75 bits per inch.

48. The convertible transaction card of claim 46, wherein the encoded data on the second of the two tracks is encoded at about 100 bits per inch.

49. A convertible transaction card for consummating an indicated transaction comprising:
(a) a standard size transaction card body having a front side and a back side;
(b) a keychain size transaction card formed as an integral portion of the standard size transaction card body such that the standard size transaction card body and the integrated keychain size transaction card together comprise a standard size convertible transaction card assembly;
(c) a delineation line on the standard size transaction card body defining the boundaries of the keychain size transaction card and facilitating the separation of the keychain size transaction card from the standard size transaction card body; and,
(d) a transaction information medium, contained within the boundaries of the keychain size transaction card which contains all transaction information required to consummate the indicated transaction such that either the standard size convertible transaction card assembly or the keychain size transaction card, as separated from the standard size transaction card body, is able of independent use as a transaction card for consummating the indicated transaction wherein the transaction information medium is a magnetic stripe positioned parallel to long edge of the standard size convertible transaction card assembly wherein the magnetic strip from the leading edge of the standard size transaction card body to the delineation line proximate the leading edge is quiescent; and, wherein the magnetic strip from the delineation line proximate the trailing edge to the trailing edge of the standard size transaction card body is quiescent.

* * * * *